United States Patent [19]

Granberg

[11] 3,965,788

[45] June 29, 1976

[54] LUMBER MAKING ATTACHMENT

[76] Inventor: Elof Granberg, 201 Nevin Ave., Richmond, Calif. 94801

[22] Filed: June 11, 1974

[21] Appl. No.: 478,245

Related U.S. Application Data

[63] Continuation-in-part of Ser. No. 417,603, Nov. 20, 1973, abandoned.

[52] U.S. Cl. .................................. 83/745; 83/794; 83/574; 30/371
[51] Int. Cl.² ................... B27B 17/02; B27B 27/02
[58] Field of Search ............ 83/794, 799, 788, 795, 83/796, 797, 798, 801, 574, 613, 636, 745, 743; 30/377, 371

[56] References Cited
UNITED STATES PATENTS

| | | | |
|---|---|---|---|
| 2,779,359 | 1/1957 | Koski | 83/574 |
| 3,051,203 | 8/1962 | Hayden | 83/794 |
| 3,134,409 | 5/1964 | Hayden | 83/794 X |
| 3,225,799 | 12/1965 | Hayden et al. | 83/794 X |
| 3,864,830 | 2/1975 | Haddon | 83/745 X |

Primary Examiner—Donald R. Schran
Attorney, Agent, or Firm—Bruce & McCoy

[57] ABSTRACT

A lumber making attachment comprising a saw guide for use with a portable chain saw having a frame with a crossmember assembly mounted thereon which is adapted to slidably engage a guide member positioned on the lumber being cut or to engage an edge surface of the lumber itself. Said frame also having a means for adjustably securing said frame to the saw bar of a chain saw in a manner whereby in operation the cutting elements of said chain saw will engage a portion of the lumber being cut at a predetermined angle and along a predetermined course substantially parallel to the axis of said guide member or said lumber edge. Support means are provided to permit substantially parallel cuts of uniform thickness across the entire width of said lumber.

4 Claims, 11 Drawing Figures

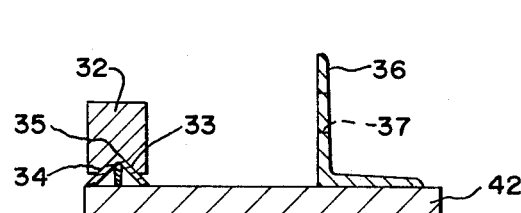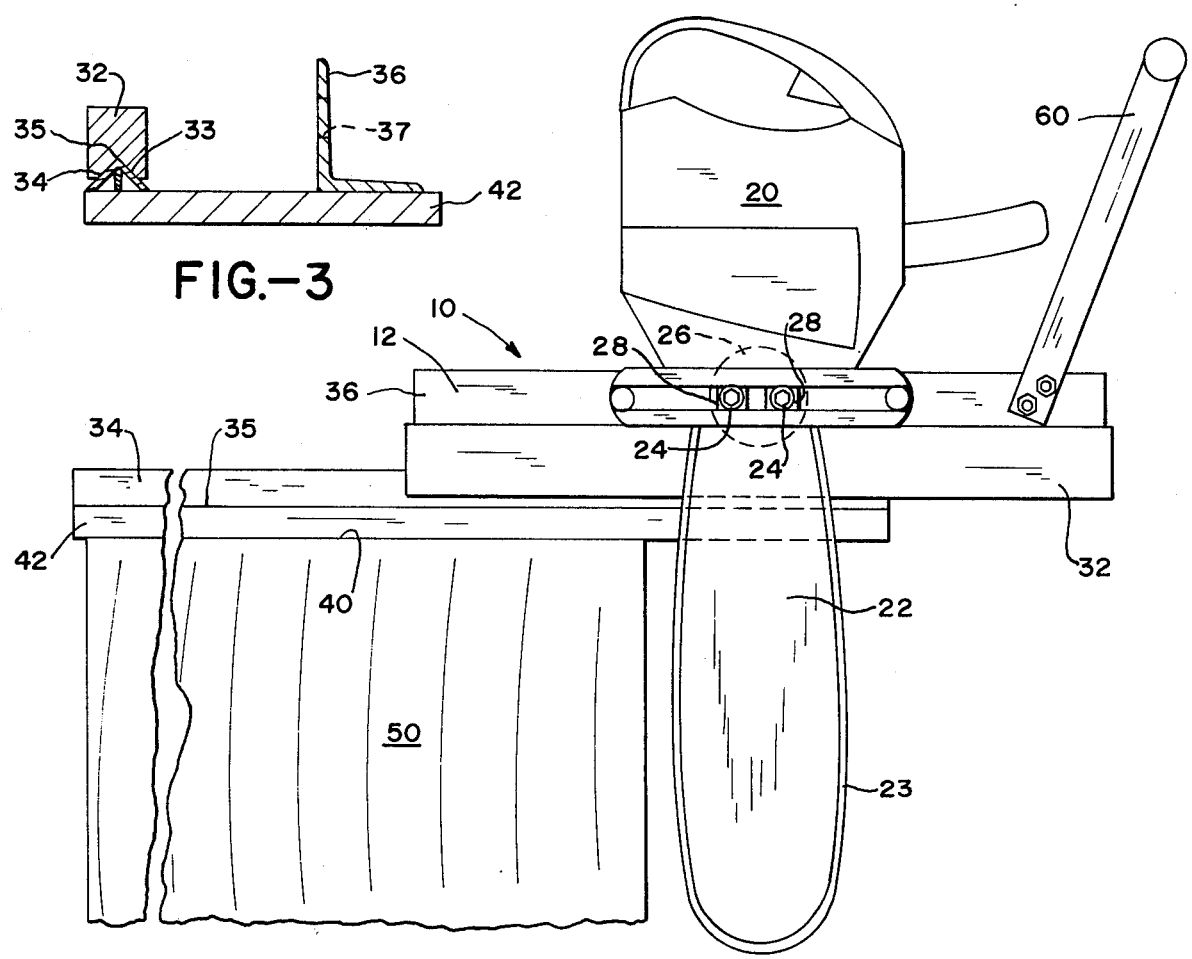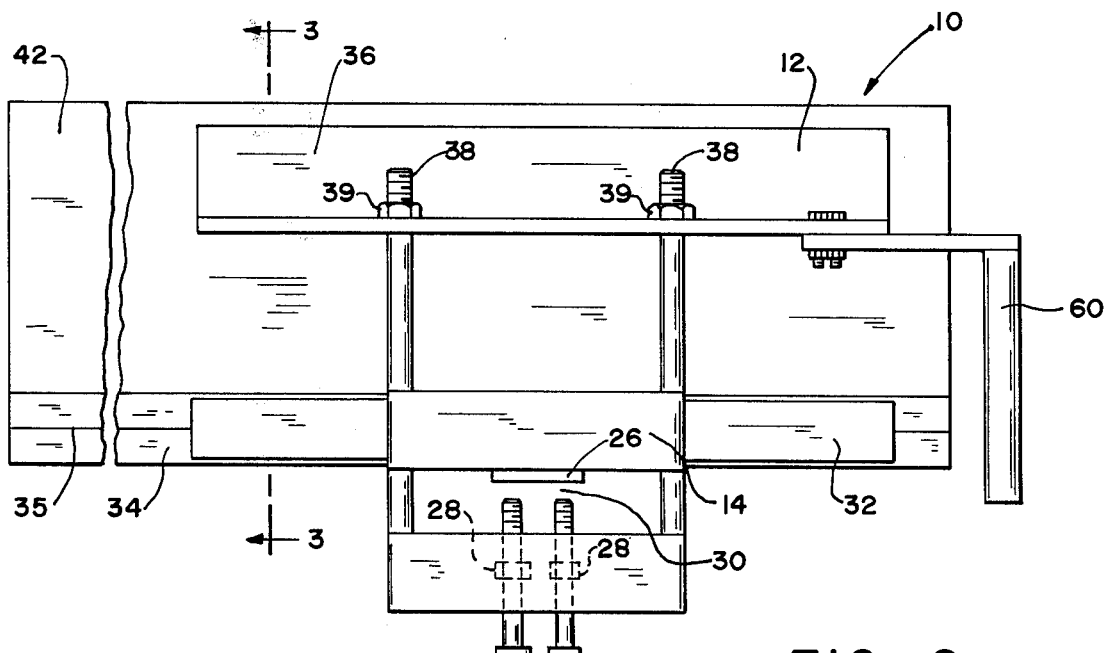

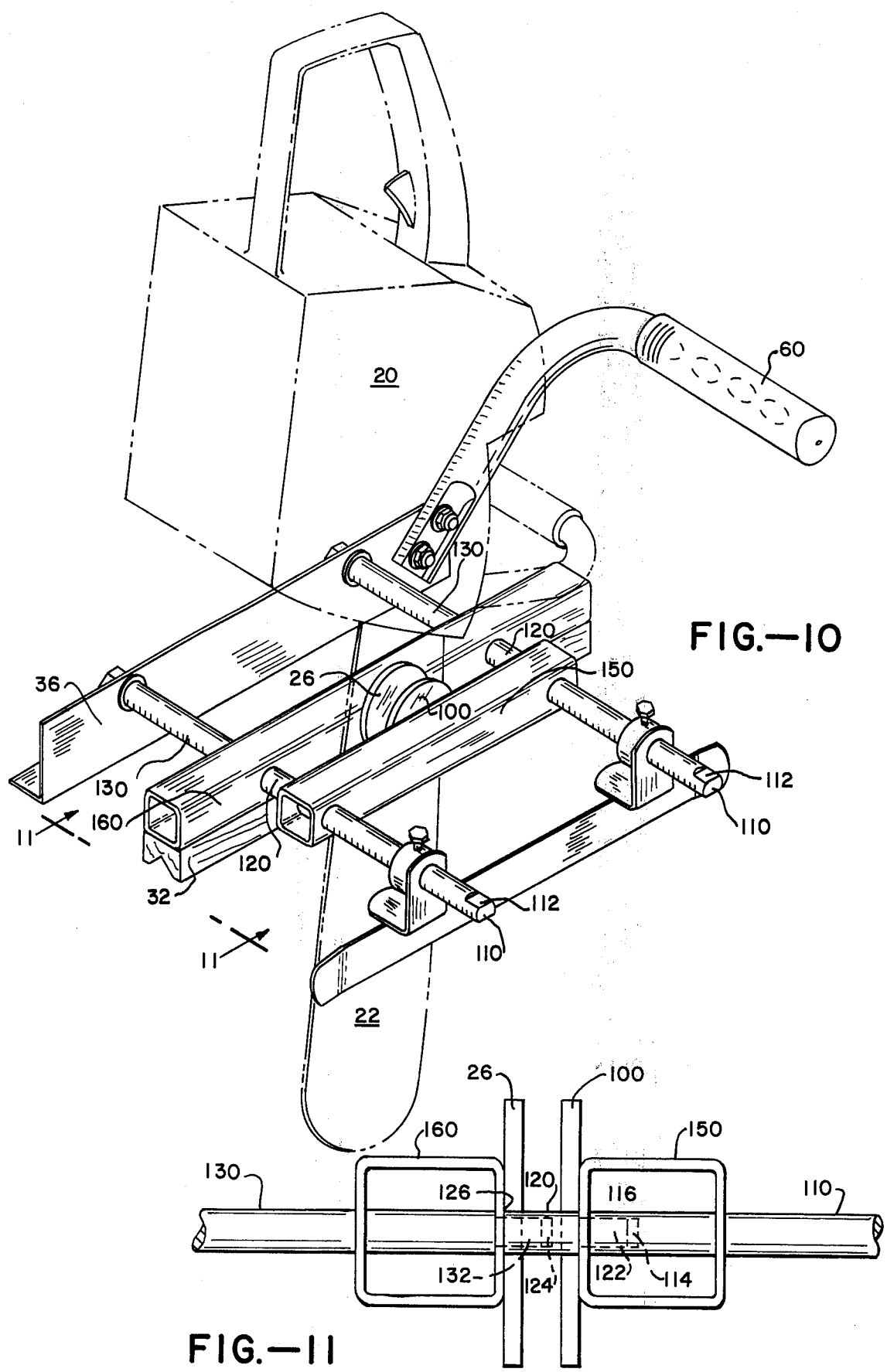

LUMBER MAKING ATTACHMENT

CROSS-REFERENCE TO RELATED APPLICATION

This application is a continuation-in-part of application Ser. No. 417,603, filed Nov. 20, 1973 now abandoned.

BACKGROUND OF THE INVENTION

1. Field of the Invention

The present invention relates generally to a lumber making attachment of use with chain saws, and more particularly, to an improved saw guide which may be attached to a portable chain saw for the purpose of sawing lumber from logs and the like.

2. Description of the Prior Art

Saw guides for use with portable chain saws are well known in the lumber industry. Such guides are typically used for ripping and cross-cutting operations such as the squaring of the ends and sides of logs and the trimming off of the sides of boards and other types of lumber.

For example, the saw guide disclosed in U.S. Pat. No. 3,051,203 to Hayden accomplishes such operation through the utilization of various roller combinations to both support the saw guide and attached chain saw and allow its free movement along a guide member attached to a flat upper surface of the lumber being cut. The flat upper surface is supplied by either sawing the upper surface of the log itself or by attaching a flat board thereto. The guide member, which may be a pipe or similar straight channel, is attached to the flat surface in a manner so as to continuously cooperate with vertically disposed rollers provided in the saw guide carriage along the length of the log during the sawing operation, thereby enabling the operator to make straight and substantially flat cuts along the entire length of the log.

It has been found that saw guides of this type have great practical value in that they allow the use of chain saws and other portable power driven saws for cutting boards and similar lumber products from logs directly in the forest or farmyard, thereby avoiding the necessity and expense of hauling the logs to a saw mill.

However, certain problems have been encountered in using conventional saw guides such as that disclosed in the above-discussed Hayden patent. One of these problems has arisen due to the fact that sawdust and wood chips frequently become lodged in the guide carriage and its associated roller during the sawing operation. Whenever this condition occurs, it results in an interference with the free movement of the guide carriage along the guide member. This is due to the fact that the sawdust prevents the guide carriage rollers from freely turning against the guide member and flat upper surface of the log, thereby jamming the saw guide in place at that point or otherwise causing uneven cuts of the lumber. In order to free the saw guide, the operator must back the guide carriage along the guide member and clear the roller path or, in some cases, must actually remove the guide carriage and attached chain saw from the guide member. Of course, the necessity of clearing sawdust and wood chips from the saw guide from time to time is highly undesirable in that it substantially decreases the output and efficiency of the operator during the sawing process. In addition, the natural tendency of the rollers to ride up over sawdust and wood chip deposits in their path often results in uneven cuts along the cutting surface.

Another drawback experienced with the Hayden saw guide is that it is designed so that the operator must be positioned immediately above the saw in order to push the device along the cutting surface, thereby causing sawdust to be thrown directly up into the operator's face and, hence, interfering with his vision and normal breathing.

Furthermore, the means for securing the frame of the Hayden saw guide to the chain saw requires that holes be drilled in the saw bar of the chain saw at specific points so that in operation the cutting elements of the chain saw will engage the lumber being cut at a predetermined angle which is correlated to the hardness and texture of that particular lumber. Therefore, if it is later desired to cut lumber having a substantially different hardness and texture, the chain saw must be removed from the saw guide and new holes must be drilled in the saw bar in order to allow for a different cutting angle.

An additional problem found with conventional saw guides is that in many cases uniform parallel cuts at the outer edge of a log cannot be made due to the fact that it is impossible to rigidly attach and maintain the flat board along which the saw guide travels to the curved upper surface of the log near its edge with the flat top surface of the board perpendicular to the desired saw cut.

SUMMARY OF THE INVENTION

The present invention is an improved lumber making attachment which obviates the problems and drawbacks experienced with conventional saw guides heretofore available in the industry.

This is accomplished in the present invention by providing a saw guide having a frame with a crossmember assembly mounted thereon which includes a means adapted to slidably engage a guide member positioned on the lumber being cut or, in the alternative, to engage an edge surface of the lumber itself. The frame also includes an improved means for securing it to the saw bar of a chain saw in a manner so that the cutting angle of the chain saw cutting elements may be quickly and easily changed without the necessity of removing the chain saw from the saw guide and drilling holes in the saw bar. Likewise, the saw guide of the present invention is designed so that the operator may push it along the cutting surface in such a manner that the sawdust produced during the cutting process is diverted away from the operator's face.

It is an important feature of the present invention that it does not utilize rollers along its bearing surfaces, thereby eliminating the jamming and uneven cutting problems experienced with conventional saw guides. The sliding surfaces of the present invention tend to clear their own path through the sawdust and wood chips produced during the cutting process by pushing such particles out of the way with their leading edge.

In addition, support means are provided for use with the saw guide of the present invention in order to permit substantially parallel cuts of uniform thickness across the entire width of a log, including the curved outer edge thereof.

Other features and advantages are inherent in the subject matter claimed and disclosed or will become apparent to those skilled in the art from the following detailed description of the preferred embodiment taken in conjunction with the accompanying diagrammatic drawings.

DESCRIPTION OF THE DRAWINGS

FIG. 1 is a partial side elevation view of an embodiment of a lumber making attachment, with an attached chain saw, constructed in accordance with the present invention;

FIG. 2 is a partial top plan view of the structure shown in FIG. 1;

FIG. 3 is a rear sectional view of the lumber making attachment taken along line 3—3 in FIG. 2;

FIG. 10 is a perspective view illustrating another embodiment of the means for securing the saw bar of a chain saw to the saw guide frame; and FIG. 11 is a partial front sectional view taken along line 11—11 in FIG. 10.

DESCRIPTION OF THE PREFERRED EMBODIMENT

Figure 6:
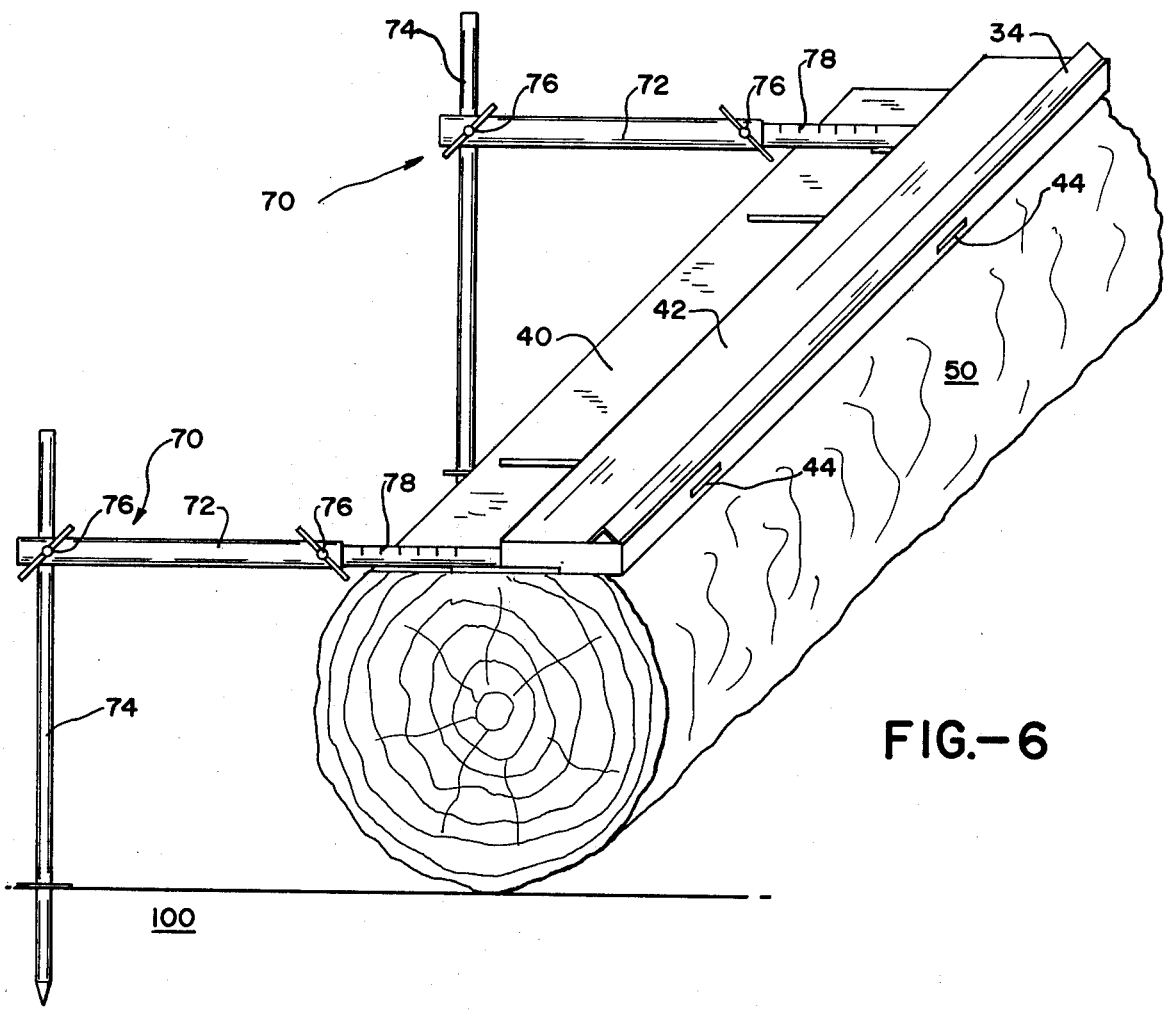
FIG. 6 is a partial perspective view illustrating the support means provided for use with the structure shown in FIG. 1.

Referring initially to FIGS. 1 and 2, there is illustrated an embodiment of a lumber making attachment, indicated generally at 10, constructed in accordance with the present invention. Attachment 10 includes a frame 12 having a crossmember assembly 14 mounted thereon.

Also illustrated in FIG. 1 is a portable chain saw 20 of conventional construction having a saw bar 22 which is adjustably secured to frame 12 by means of threaded clamping bolts 24 which may be tightened against one side of the saw bar 22 in such a manner so as to secure the saw bar between clamping bolts 24 and clamping plate 26. Threaded clamping bolts 24 are secured to frame 12 in the preferred embodiment by means of welding correspondingly threaded nuts 28 to the appropriate lateral edge of crossmember assembly 14. Clamping platform 26 is likewise welded to crossmember assembly 14 in such a position that a space 30 is provided between it and clamping bolts 24 which will allow saw bar 22 to be inserted therebetween.

It can be seen from reference to FIG. 1 that the above-described means for securing the saw bar to the saw guide frame allows for a wide range of cutting angles, which represent the angle between the top surface 40 of log 50 and the line along which the cutting elements 23 of the chain saw engage the portion of the log being cut. This angle may typically be varied from 45° to 90° from the horizontal in order to facilitate the cutting of various types of lumber having differing hardness and texture characteristics. Since saw bar 22 is simply secured to the saw guide frame by means of the frictional engagement of the clamping bolts 24 holding the saw bar 22 against the clamping platform 26, the cutting angle may be quickly and easily adjusted by loosening the clamping bolts, tilting the chain saw to the desired angle and retightening the clamping bolts again. With this securing arrangement, no holes need be drilled in the saw bar 22.

An alternate embodiment of a means for securing the saw bar to the saw guide frame is shown in FIGS. 10 and 11. In general, rather than utilizing clamping bolts 24 of the embodiment illustrated in FIG. 1, a second clamping plate 100 is located opposite the original clamping plate 26 and the saw bar 22 is secured therebetween. This is accomplished by drawing second clamping plate 100 against the saw bar 22 which, in turn, urges the saw bar against fixed clamping platform 26 on the opposite side thereof. The frictional engagement of the saw bar between the large bearing areas of the two clamping platforms secures it in place on the frame.

Second clamping plate 100 is drawn against saw bar 22 by means of tightening clamping rods 110 with a wrench or the like at flat portions 112 formed at one end thereof. Rods 110 have threaded female apertures 114 formed at the other end thereof into which corresponding male threaded portions 122 of spacing rods 120 screw. Rods 110 pass through holes formed in the outer wall of clamping bar 150 and shoulders 116 bear against the inner wall of the clamping bar 150 in which holes are formed which permit the smaller threaded portions 122 of spacing rods 120 to extend. As is shown in the drawings, clamping plate 100 is mounted on the opposite side of this inner wall of clamping bar 150 equidistant between the clamping rods.

Spacing rods 120 have treaded female apertures 124 formed at the end thereof opposite male portions 122. Threaded portions 132 of frame rods 130 screw into female apertures 124 and shoulders 126 of spacing rods 120 abut the outer wall of guide bracket 160 on which bearing runner 32 is mounted. In this manner the entire frame assembly is held together.

It can be seen from the foregoing description that saw bar 22 may be quickly and easily secured between clamping plate 26 and 100 by simply tightening clamping rods 110 with a wrench, which in turn draws rod shoulders 116 against clamping bar 150. Clamping bracket 150 and clamping plate 100 are thereby drawn against saw bar 22 and clamping plate 26.

Since the surface areas of clamping platforms 26 and 100 which bear against saw bar 22 are relatively large, a great deal of compressive pressure may be applied to the saw bar in securing it without fear of causing any damage to the saw bar. Likewise, the length of spacing rods 120 also determine the maximum amount of compressive pressure that may be applied to the saw bar.

This has proven to be an important feature in use since it has been found in certain instances that overtightening of clamping bolts 24 such as are illustrated in FIG. 1 has caused fracturing of the hard steel saw bar. This has been particularly true in those cases where the tip of the clamping bolt must slightly penetrate or deform the saw bar in order to adequately secure it to frame 12. A serious safety hazard to the operator is presented in such cases since fracturing of the saw bar in operation may cause violent disintegration of it by cutting elements 23 thereby resulting in propulsion of pieces of metal about the cutting area.

Referring now to FIGS. 1-3, crossmember assembly 14 also includes a guide bearing runner 32 mounted on the underside thereof which is adapted to slidably engage guide member 34. In the preferred embodiment, guide member 34 comprises an elongated section having an inverted V-shape configuration which is attached along the length of flat top surface 40 with its crown portion 35 facing upward. Flat surface 40 may be supplied by either sawing the upper surface of the log 50 itself or by removably attaching a flat board 42 thereto as is illustrated in the drawings.

As is best illustrated by FIG. 3, runner 32 has a V-shaped groove 33 formed in its underside which slidably engages the crown portion 35 of guide member 34. Although a guide member having an inverted V-shaped configuration and a correspondingly shaped runner groove have been illustrated in the preferred embodiment, it is to be noted that guide members and runners having other configurations may be utilized to accomplish the same function.

It has been found that utilization of construction grade aluminum for the guide member 34 and a self-lubricating plastic or hardwood such as teak or oil impregnated oak for guide bearing runner 32 provide bearing surfaces with a sufficiently low coefficient of friction so as to allow free sliding movement of the saw guide and attached chain saw in operation.

Crossmember assembly 14 is also provided with a stabilization rail 36 which is mounted on the other lateral edge of crossmember assembly 14, opposite of and parallel to bearing runner 32. Stabilization rail 36, which for weight and frictional considerations may also be made of construction grade aluminum or similar materials, serves to maintain the cutting plane of saw bar 22 in a substantially perpendicular relationship to the plane of top surface 40 during the cutting operation. The height of stabilization rail 36 may be adjusted with respect to the level of bearing runner 32 by means of moving the rail up or down along vertically disposed slots 37 formed in the rail through which crossmember studs 38 extend. Nuts 39 may be tightened on studs 38 and against rail 36 in order to lock the rail at the desired height.

Handle 60 is mounted at one end of stabilization rail 36 and is used during the cutting process by the operator to aid in pushing the saw guide and attached chain saw along the length of the log. In operation, the operator grasps the saw guide handle 60 in one hand and the portable chain saw handle and trigger (not shown) with his other hand. The mounting of handle 60 on stabilization rail 36 has the practical effect of enabling the operator to apply sufficient pressure on the rail to keep it in continuous contact with upper log surface 40, thereby insuring uniform flat cuts of lumber, while at the same time permitting the operator to stand to the rear of the device as it is pushed along the cutting surface, thereby avoiding the sawdust created during the cutting operation.

As the saw is pushed along the length of the log by the operator, it is guided in a substantially straight line by guide member 34. After a board is sawed off the log, guide member 34 is detached from the log and moved over a distance equal to the thickness of the next board desired to be cut, plus kerf, and the cutting process is repeated. As has been noted above, in sawing operations where the log is not provided with a flat upper surface 40, a suitable board 42, such as a 2 inches by 6 inches plank, may be positioned on the top of the rough log and affixed rigidly thereto by nailing and the like. Guide member 34 is attached to the top surface of this board so that a suitable flat surface is provided over which the saw guide may freely slide.

As a result of the sliding movement of the guide bearing runner 32 and stabilization rail 36 across the upper surface of the guide member 34 and surface 40 respectively, sawdust and wood chips produced during the cutting process are pushed away from the path of the saw guide as it is pushed along the length of the log by the operator. In fact, it is believed that any fine sawdust particles left behind which enter between the bearing surfaces actually act as a lubricant, thereby providing for freer movement of the saw guide and attached chain saw along the surface of the log.

Figure 4:
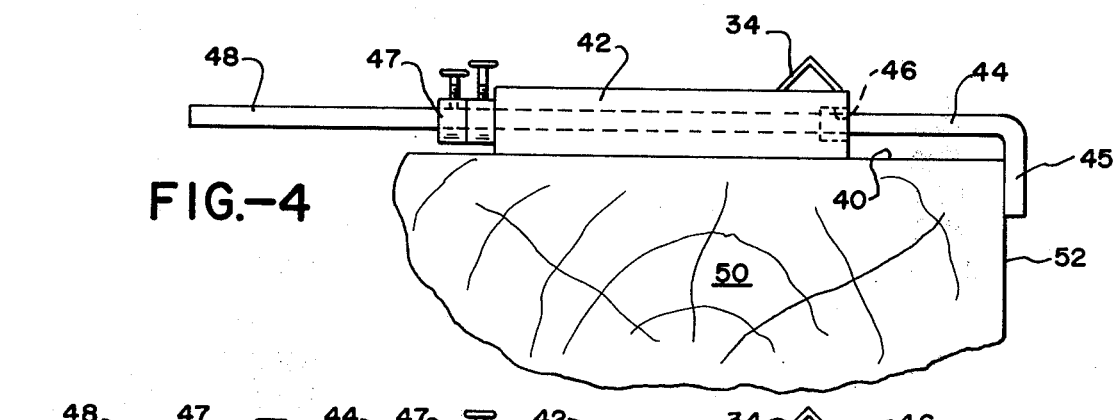
FIG. 4 is a fragmentary front view illustrating a portion of the structure shown in FIG. 1.
Figure 5:
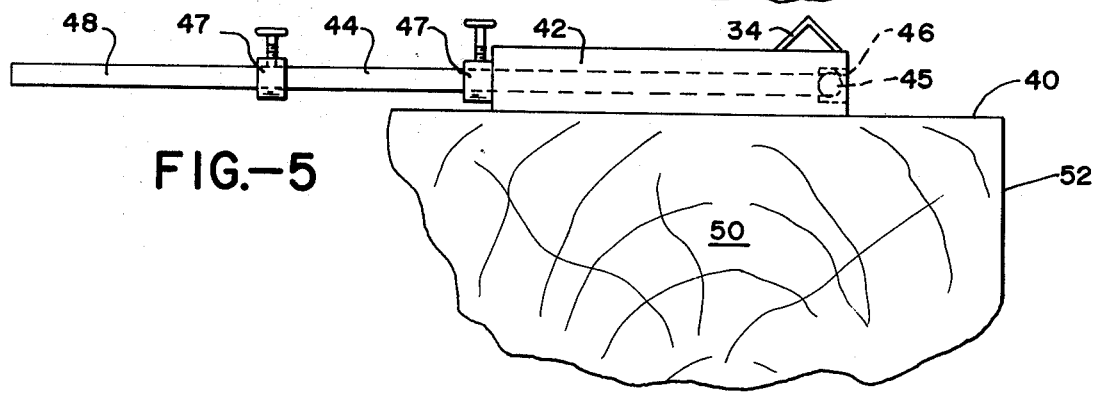
FIG. 5 is a front view similar to FIG. 4 but with a portion of the structure illustrated in a different position.

Referring now to FIGS. 4-6, thickness stops 44 are provided in flat board 42 as a means for insuring that parallel cuts of uniform thickness are repeated across the width of log 50. As is illustrated in FIG. 6, thickness stops 44 extend through board 42 and are spaced apart thereon an appropriate distance so that after a cut has been completed, board 42 may be moved over and quickly realigned on top surface 40 to allow for the next cut substantially parallel to the completed cut.

In order to accomplish this feature, stops 44 have a hooked portion 45 positioned at one end thereof which is designed to engage cut edge 52 when the stop is extended from recess 46 formed in board 42. Adjustably mounted on shaft portion 48 of stops 44 away from hooked portion 45 are self-securing lugs 47 which permit the stops to be extended through board 42 only a distance corresponding to the width of the cuts desired to be made in log 50.

Once board 42 has been positioned the desired distance from edge 52 and rigidly secured on flat upper surface 40 (as illustrated in FIG. 4), hooked portion 45 is retracted into recess 46 and retained therein by self-securing lugs 47 (as illustrated in FIG. 5), in order not to interfere with the cutting edge of the saw, and the cutting process is repeated.

FIG. 6 also illustrates a support means 70 which is utilized to stabilize flat board 42 on the top surface 40 of log 50. Such stabilization is necessary since it is not otherwise possible to rigidly secure board 42 near the curved outer edges of log 50 so that its flat surface will be perpendicular to the desired cutting surface. Through the utilization of support means 70 in the manner shown in FIG. 6, saw cuts of uniform thickness may be made across the entire width of the log.

In the preferred embodiment, support means 70 includes two telescoping outrigger legs 72 which are attached at their end to board 42. At their other end, legs 72 are secured to spike rods 74 which are embedded in the ground 101. Adjusting clamps 76 are provided to permit the leveling of board 42 in relation to rods 74 and the telescoping of outrigger legs 72 as board 42 is moved across the surface of log 50. It has been found with the geometry of support means 70 shown in FIG. 6 that board 42 need be attached only along a small width of upper surface 40 in order to rigidly secure it during the cutting operation. This permits saw cuts to be made up to both lateral edges of log 50.

Cut graduation marks 78 are provided at 1 inch intervals on a portion of telescoping outrigger legs 72 in order to allow for positive alignment of board 42 across the surface of the log in operation.

Figure 7:
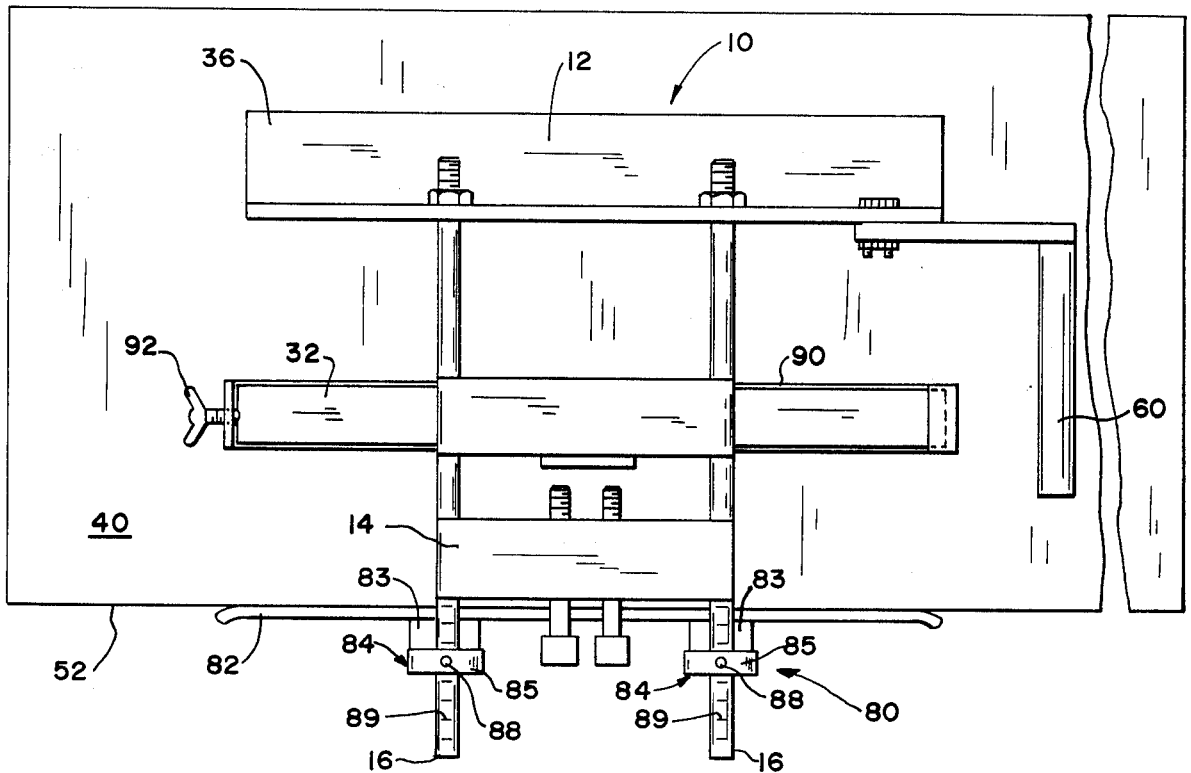
FIG. 7 is a partial top plan view of the lumber making attachment of the present invention illustrating guide means engaging an edge surface of the lumber being cut.
Figure 8:
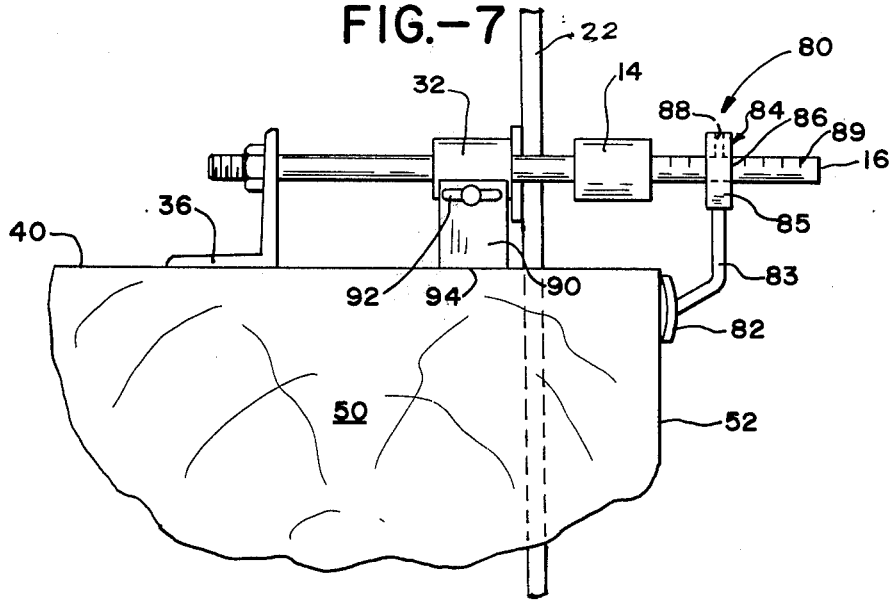
FIG. 8 is a partial front view of the lumber making attachment shown in FIG. 7.
Figure 9:
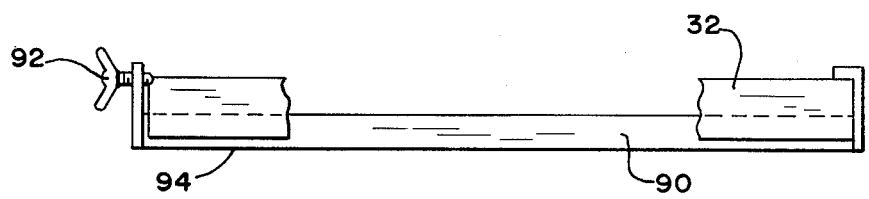
FIG. 9 is a fragmentary side elevation view illustrating a portion of the structure shown in FIG. 7.

Referring now to FIGS. 7-9, there is illustrated an embodiment of the invention wherein a guide assembly is provided to slidably engage a flat edge surface of the lumber to be cut. In situations where a flat upper surface 40 and edge surface 52 are provided, the necessity of utilizing the above-discussed board 42 and attached guide member 34 may be avoided by attaching guide assembly 80 to lumber making attachment 10.

Guide assembly 80 includes a side rail guide 82 which is secured to frame pins 16 of the crossmember assembly 14 by means of mounting clamps 84. Mounting clamps 84 comprise wing sections 85 having a hole 86 formed in the center thereof through which frame pins 16 extend. Support arms 83 are welded at one end to rail guide 82 and at the other end to ring sections 85 thereby enabling the guide assembly to be adjustably secured on frame pins 16 when ring set screws 88 are tightened against said pins. Guide assembly 80 may be adjustably moved along frame pins 16 when set screws 88 are loosened in order to allow for saw cuts of various thicknesses. Guide marks 89 are provided on frame pins 16 in order to enable the quick and accurate alignment of ring sections 85 with respect to each other and with respect to the cutting plane of the chain saw when the board thickness is set.

As is best illustrated in FIG. 9, a guide insert 90 is removeably attached to bearing runner 32 by means of wing screw 92 when the lumber making attachment is used in this mode without the guide member. The function of guide insert 90, which is an aluminum inverted V-rail section corresponding to the configuration of the bearing runner with a flat bottom portion 94, is to level the runner assembly with respect to stabilization rail 36 and to provide a bearing surface to slide across log top surface 40.

When the lumber making attachment is utilized in the configuration described above and illustrated in FIGS. 7-9, the operator grasps saw guide handle 60 in one hand and the portable chain saw handle and trigger (not shown) with his other hand and pushes the device along the length of the log thereby making the desired lumber cut. As long as rail guide 82 is maintained against edge surface 52 of the log, cuts of uniform thickness may be made. Likewise, the plane of the cuts will be perpendicular to upper surface 40 of the log as long as bottom portion 94 of guide insert 90 and stabilization rail 36 are continuously maintained against the surface during the cutting operation. As discussed previously above, guide handle 60 aids the operator in accomplishing this result, while at the same time permitting the operator to be positioned sufficiently to the rear of the device to avoid the sawdust produced in the cutting operation.

The foregoing detailed description has been given for clearness of understanding only, and no unnecessary limitations should be understood therefrom, as modifications will be obvious to those skilled in the art.

What is claimed is:

1. A lumber making attachment for use in cutting lumber with a chain saw comprising
    an elongated longitudinal support member having an elongated guide bearing runner secured to the underside thereof, said guide bearing runner having a longitudinal inverted "V" shaped groove formed in the underside thereof for slidably engaging a mating guide member positioned on the upper surface of said lumber whereby said guide member can be comprised of a single piece of angle iron disposed longitudinally on said lumber with its V back inverted and pointing upward for mating with said elongated guide bearing runner,
    at least two elongated horizontal crossmembers secured to and extending in opposite directions from said support member, and engaging a stabilization rail mounted in spaced relation and substantially parallel to said guide bearing runner and support member, said stabilization rail being adapted to slide along a planar surface disposed perpendicular to the cut to be made in the lumber by the chain saw for rigidly supporting the cutter bar of the chain saw with respect to said lumber,
    an elongated clamping bar mounted to said horizontal crossmembers on the side of said support member opposite said stabilization rail, said clamping bar being adjustably movable along said crossmembers with respect to said support member for securing the cutter bar of the chain saw therebetween, a first clamping plate being secured to said support member substantially midway between said horizontal crossmembers and a second clamping plate being secured to said clamping bar substantially opposed to said first clamping plate whereby the saw bar of said chain saw can be rigidly secured by said plates parallel and at any preselected angulation with respect to said support member and guide bearing runner, and
    a push bar secured to said frame for moving said support member and the chain saw along the guide member.

2. The lumber making attachment of claim 1 further comprising a guide rail mounted to said horizontal crossmembers outboard from said clamping bar for sliding along a planar surface parallel to the cut to be made in the lumber by the chain saw, said guide member being adjustably movable along said crossmembers with respect to said support member for determining the thickness of cut to be made by said chain saw.

3. The lumber making attachment of claim 1 further comprising a substantially flat board removably positioned on the upper surface of said lumber substantially parallel to said cutting course, and having said guide member attached to the top surface thereof and being adapted to slidably engage the bottom surface of said stabilization rail, said flat board further comprising retractable thickness stops extending through said board in a spaced apart relation and having a hooked portion positioned at one end thereof which is designed to engage a cut edge of said lumber and having self-securing lugs adjustably mounted on the other end thereof which permit the stops to be extended through said board a distance corresponding to the width of the next lumber cut desired to be made.

4. A lumber making attachment for use in cutting lumber with a chain saw comprising
    an elongated longitudinal support member having an elongated guide bearing runner secured to the underside thereof, said guide bearing runner having a groove formed in the underside thereof,
    at least two horizontal crossmembers secured to said support member, and engaging a stabilization rail mounted in spaced relation and substantially parallel to said guide bearing runner and support member,
    means on the frame formed by said support member and crossmembers for securing said frame to the saw bar of said chain saw substantially parallel and at a predetermined angulation with respect to said support and guide bearing runner, and a substantially flat board removably positioned on the upper surface of said lumber substantially parallel to said cutting course, and having said guide member attached to the top surface thereof and being adapted to slidably engage the bottom surface of said stabilization rail, said flat board further comprising retractable thickness stops extending through said board in a spaced apart relation and having a hooked portion positioned at one end thereof which is designed to engage a cut edge of said lumber and having self-securing lugs adjustably mounted on the other end thereof which permit the stops to be extended through said board a distance corresponding to the width of the next lumber cut desired to be made.

* * * * *